No. 738,171. Patented September 8, 1903.

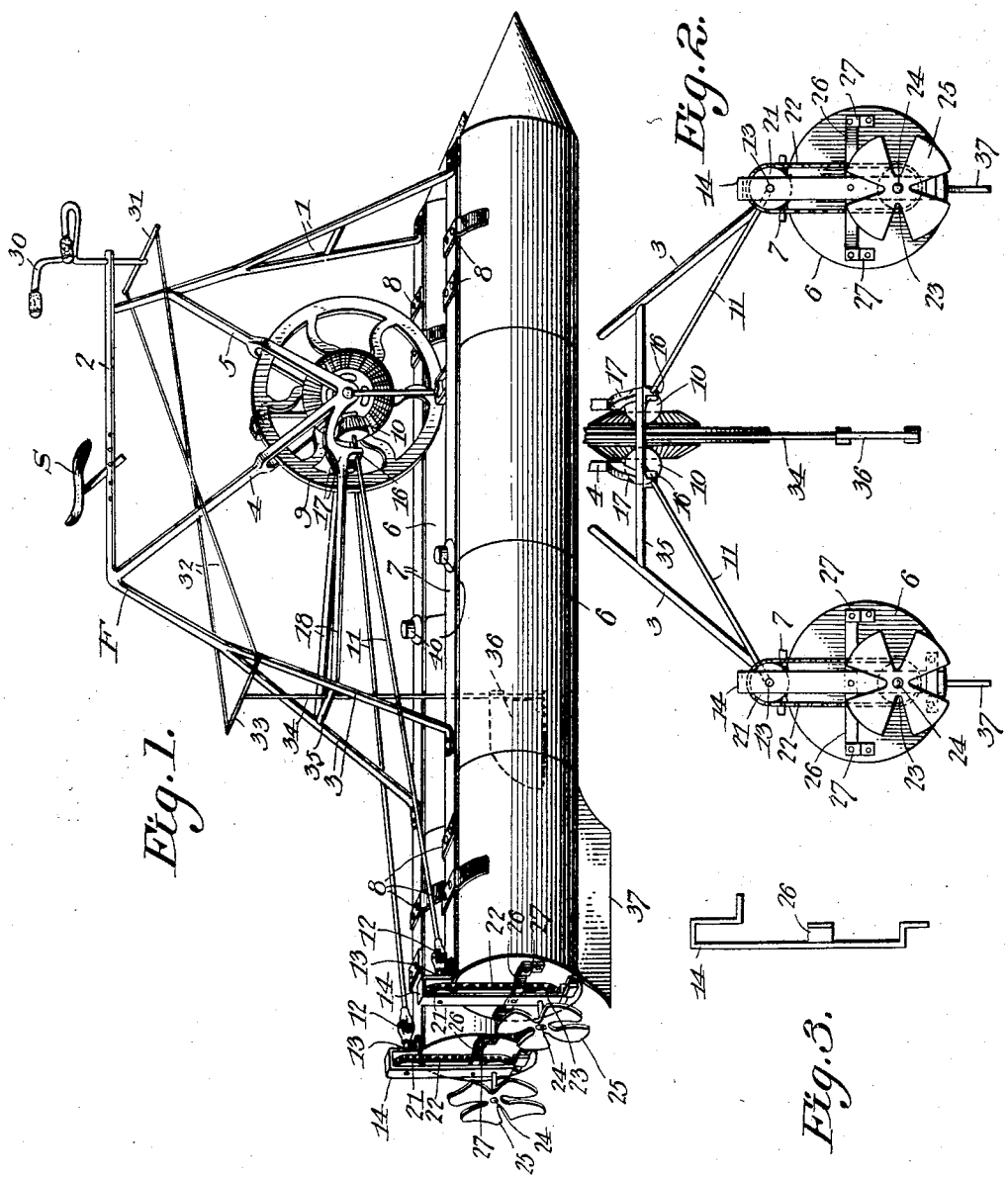

UNITED STATES PATENT OFFICE.

NATHANIEL R. DUNGEE, OF NEAR OKLAHOMA CITY, OKLAHOMA TERRITORY.

WATER-VELOCIPEDE.

SPECIFICATION forming part of Letters Patent No. 738,171, dated September 8, 1903.

Application filed May 3, 1902. Serial No. 105,863. (No model.)

*To all whom it may concern:*

Be it known that I, NATHANIEL R. DUNGEE, a citizen of the United States, residing near Oklahoma City, county of Oklahoma, Territory of Oklahoma, have invented a new and useful Water-Velocipede, of which the following is a specification.

My invention relates to water-velocipedes; and it consists in a pair of cylindrical floats, a suitable frame mounted thereon, a seat, an improved propelling mechanism comprising a combined double-bevel gear and fly wheel, diverging rotating shafts having beveled pinions in engagement with the double bevel-gear, and propellers driven by means of the diverging shafts.

The object of the invention is to provide an improved form of propelling mechanism for water-velocipedes, whereby more effective propulsion of a water-velocipede is obtained with the expenditure of a given amount of power, and to improve generally the construction of apparatus of the character specified.

In describing the invention reference will be had to the accompanying drawings, forming part of the specification, in which—

Figure 1 is a perspective view of the water-velocipede complete. Fig. 2 is an end view of the velocipede with parts removed in order to show the means for attaching the propellers and the propeller-driving mechanism to the supporting-tanks. Fig. 3 is a detail view, in side elevation, of one of the frames supporting the sprockets by which the propellers are driven.

Referring to the drawings, in which corresponding parts are indicated by the same characters of reference throughout, F designates generally a frame resembling in some respects that used upon an ordinary bicycle and comprising the forward members 1 1, the horizontal reach 2, the rear supporting members 3 3, and the gear-wheel-supporting forks 4 and 5.

6 6 designate the tanks, formed, preferably, of sheet-iron and of slender cylindrical form, having pointed forward ends to facilitate the movement over and through water. Each of the tanks 6 has secured on the top thereof a board 7, which extends longitudinally of the tank and is secured in position by means of sheet-iron straps 8. The boards 7 form the surface upon which stands the frame F, which is securely fastened upon the boards by means of screws or other suitable fastening devices passing through openings provided in the lower ends of the supports 1 1 and 3 3.

9 designates a combined gear and fly wheel rotatably mounted in the forks 4 and 5 and having two oppositely-disposed series of cogs formed thereon for engagement with small beveled pinions 10, each of which is mounted at the end of a rod 11, which extends rearward, downward, and outward from the combined gear and fly wheel 9, to be connected at its rear end by means of a universal joint 12 with a short shaft 13, arranged horizontally in the upper portion of a frame 14 at the rear end of one of the tanks 6. The rods 11 are supported at their forward ends by depending lugs 16, provided with openings for the passage of said rods and formed upon brackets 17 at the forward ends of rods 18, whose rear ends are secured to the rear frame-supporting members 3 3.

Each of the horizontal shafts 13 has rigidly mounted thereon a small sprocket 21, over which runs a sprocket-chain 22, which also engages a similar sprocket-wheel 23, rotatably mounted in the lower part of one of the frames 14 and rigidly secured upon a horizontal shaft 24, at the rear end of which is mounted a propeller 25. The frames 14, in which are supported the sprockets by means of which power is transmitted to the propellers, are securely fastened to the tanks 6 by means of rivets passing through suitable lugs on the frames and by means of the horizontal members 26, which are secured in brackets 27, rigidly fastened to the ends of the tanks.

The two propellers 25 are rotated in opposite directions when the gear-wheel 9 is driven by means of the paddles associated therewith, and consequently are arranged with oppositely-disposed blades, so that both will be effective in propelling the water-velocipede in the same direction.

The steering mechanism of the water-velocipede comprises a handle-bar 30, pivotally supported at the forward end of the horizontal frame members 2 and having at the bottom thereof a transverse piece 31, a pair of crossed wires 32, attached at their forward ends to the transverse piece 31 and at their rear ends to a similar transverse piece 33 at the upper end of a rod 34, rotatively mounted in vertical position in bearings afforded by a horizontal frame member 35 between two frame members 3 3. At the lower end of the rod 34 is provided a rudder 36, which is low enough to be submerged when the water-velocipede is in use.

The seat S for a rider is adjustably mounted on the horizontal frame member 2, so that it may be accurately placed to secure the proper balancing of the velocipede.

In order to protect the propellers from breakage by contact with snags and the like, each of the tanks is provided at its rear end with a downwardly-disposed fin 37, of sheet metal, which extends below the lowest point reached by the propeller-blades, and thus forms effective means for preventing injury to the propeller-blades from contact with submerged obstacles. To prevent the sinking of the water-velocipede in case of a leak being developed in either of the tanks, each one is provided with an opening closed by a suitable cap 40, which may be removed to introduce a pump for removing any water which may enter the tanks, and a small pump will preferably be carried upon the water-velocipede for this purpose. Owing to the greater weight of the structures at the rear end of the tanks, the device when placed in the water will not sit perfectly level, but the forward ends will be tilted upward slightly, thus facilitating the forward movement of the apparatus and insuring the submergence of the propellers to sufficient depth to do effective work.

Having thus described the construction and operation of my invention, what I claim as new, and desire to secure by Letters Patent, is—

1. In a water-cycle, the combination with a pair of parallel floats, of a frame, a rider's seat supported on the frame, a double-bevel driving-gear carried by the frame, a pair of driven bevel-gears arranged on opposite sides of said driving-gear and in mesh therewith, a rearwardly-extending shaft operatively connected with each of said driven gears, a propeller at the rear of each of said floats, and driving connections between said shafts and said propellers.

2. In a water-cycle, the combination with a pair of parallel floats, of a frame, a rider's seat mounted on said frame, a double-bevel driving-gear mounted in said frame, a pair of bevel-driven gears arranged on opposite sides of said driving-gear and in mesh therewith, universally-jointed and rearwardly-diverging shafts operatively connected with said driven gears, a propeller at the rear of each float, and operative connections between said shafts and said propellers.

In testimony whereof I have signed my name to this specification in the presence of two subscribing witnesses.

N. R. DUNGEE.

Witnesses:
S. C. MAXEY,
JOHN WAND.